（12） United States Patent
Nishikori et al.

(10) Patent No.: US 11,906,042 B2
(45) Date of Patent: Feb. 20, 2024

(54) GEAR SHIFT CONTROL DEVICE OF VEHICLE

(71) Applicant: Mazda Motor Corporation, Hiroshima (JP)

(72) Inventors: Daigo Nishikori, Aki-gun (JP); Hiroaki Gotan, Aki-gun (JP); Akina Inagaki, Aki-gun (JP); Tomohiro Okubo, Aki-gun (JP); Kiminori Higo, Aki-gun (JP); Takayuki Mikami, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/190,436

(22) Filed: Mar. 27, 2023

(65) Prior Publication Data

US 2023/0313882 A1 Oct. 5, 2023

(30) Foreign Application Priority Data

Apr. 5, 2022 (JP) .................................. 2022-062940

(51) Int. Cl.
*F16H 61/02* (2006.01)
*B60L 7/26* (2006.01)

(52) U.S. Cl.
CPC ............ *F16H 61/0213* (2013.01); *B60L 7/26* (2013.01); *F16H 2061/0227* (2013.01)

(58) Field of Classification Search
CPC ................. F16H 61/0213; F16H 2061/0227
See application file for complete search history.

(56) References Cited

U.S. PATENT DOCUMENTS

| 6,070,680 | A | * | 6/2000 | Oyama | ................. | B60W 20/00 |
| | | | | | | 903/914 |
| 6,781,251 | B2 | * | 8/2004 | Takaoka | ................. | B60K 6/365 |
| | | | | | | 290/40 C |
| 2013/0197735 | A1 | * | 8/2013 | Ueno | ..................... | F01N 3/0238 |
| | | | | | | 180/65.265 |

FOREIGN PATENT DOCUMENTS

JP 2016132432 A 7/2016

* cited by examiner

*Primary Examiner* — Huan Le
(74) *Attorney, Agent, or Firm* — Alleman Hall & Tuttle LLP

(57) ABSTRACT

A gear shift control device of an automobile includes memory storing a gear shift map that defines, for each of gear shift points, thresholds of the number of revolutions to determine a switching start timing of each of the gear positions, a transmission control unit that performs switching between the gear positions based on the gear shift map, and a regeneration control unit that controls regeneration. The gear shift map includes a non-cooperative regeneration map that defines the thresholds of revolutions lower than the thresholds in a cooperative request map used in cooperative regeneration, and the non-cooperative regeneration map includes a combustion request map that defines the thresholds of low revolutions and is used when an accelerator is not used, and a travel request map that defines the thresholds of relatively higher revolutions and is used when the accelerator is used.

13 Claims, 9 Drawing Sheets

FIG. 2

|  | CL1 | CL2 | CL3 | BR1 | BR2 |
|---|---|---|---|---|---|
| FIRST GEAR | ○ |  |  | ○ | ○ |
| SECOND GEAR |  | ○ |  | ○ | ○ |
| THIRD GEAR | ○ | ○ |  |  | ○ |
| FOURTH GEAR |  | ○ | ○ |  | ○ |
| FIFTH GEAR | ○ |  | ○ |  |  |
| SIXTH GEAR | ○ | ○ | ○ |  |  |
| SEVENTH GEAR | ○ |  | ○ | ○ |  |
| EIGHTH GEAR |  | ○ | ○ | ○ |  |
| REVERSE GEAR |  |  | ○ | ○ | ○ |

FIG. 6

| 50 | | | | DURING NON-COOPERATIVE REGENERATION 52 | | | | DURING COOPERATIVE REGENERATION 51 | |
|---|---|---|---|---|---|---|---|---|---|
| | | | | COMBUSTION REQUEST | | TRAVEL REQUEST 53 | | REGENERATION REQUEST | |
| | | | | VEHICLE SPEED | NUMBER OF REVOLUTIONS | VEHICLE SPEED | NUMBER OF REVOLUTIONS | VEHICLE SPEED | NUMBER OF REVOLUTIONS |
| UPSHIFT | U1 | 1ST TO 2ND | | 12 | Ra:U1 | 12 | Rb:U1 | 12 | Rc:U1 |
| | U2 | 2ND TO 3RD | | 20 | Ra:U2 | 20 | Rb:U2 | 28 | Rc:U2 |
| | U3 | 3RD TO 4TH | | 30 | Ra:U3 | 28 | Rb:U3 | 33 | Rc:U3 |
| | U4 | 4TH TO 5TH | | 33 | Ra:U4 | 36 | Rb:U4 | 42 | Rc:U4 |
| | U5 | 5TH TO 6TH | | 41 | Ra:U5 | 45 | Rb:U5 | 53 | Rc:U5 |
| | U6 | 6TH TO 7TH | | 51 | Ra:U6 | 55 | Rb:U6 | 65 | Rc:U6 |
| | U7 | 7TH TO 8TH | | 66 | Ra:U7 | 70 | Rb:U7 | 84 | Rc:U7 |
| DOWNSHIFT | D1 | 2ND TO 1ST | | 9 | Ra:D1 | 9 | Rb:D1 | 9 | Rc:D1 |
| | D2 | 3RD TO 2ND | | 14 | Ra:D2 | 14 | Rb:D2 | 23 | Rc:D2 |
| | D3 | 4TH TO 3RD | | 23 | Ra:D3 | 24 | Rb:D3 | 29 | Rc:D3 |
| | D4 | 5TH TO 4TH | | 28 | Ra:D4 | 32 | Rb:D4 | 38 | Rc:D4 |
| | D5 | 6TH TO 5TH | | 37 | Ra:D5 | 41 | Rb:D5 | 50 | Rc:D5 |
| | D6 | 7TH TO 6TH | | 46 | Ra:D6 | 50 | Rb:D6 | 60 | Rc:D6 |
| | D7 | 8TH TO 7TH | | 61 | Ra:D7 | 65 | Rb:D7 | 79 | Rc:D7 |

FIG. 7
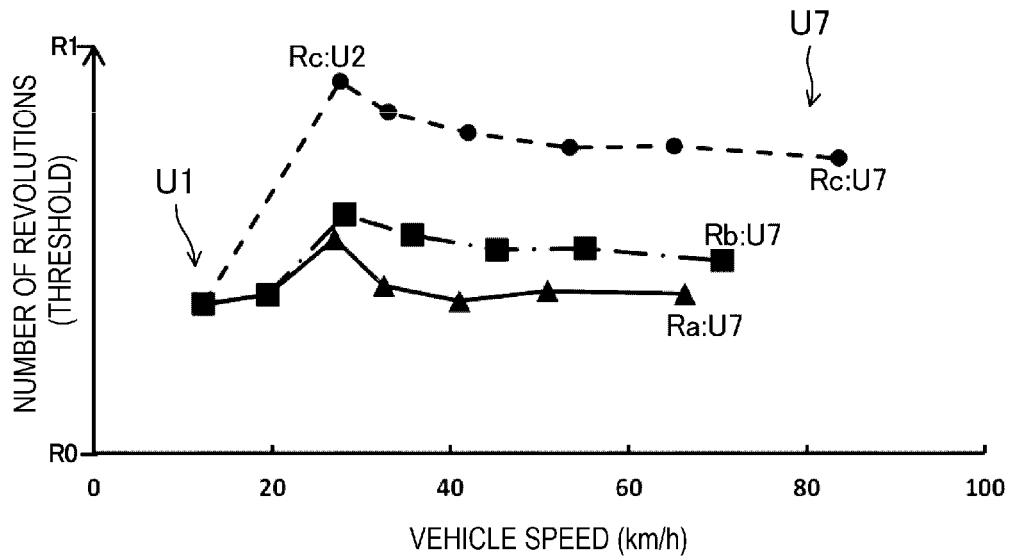
UPSHIFT SIDE
⇕
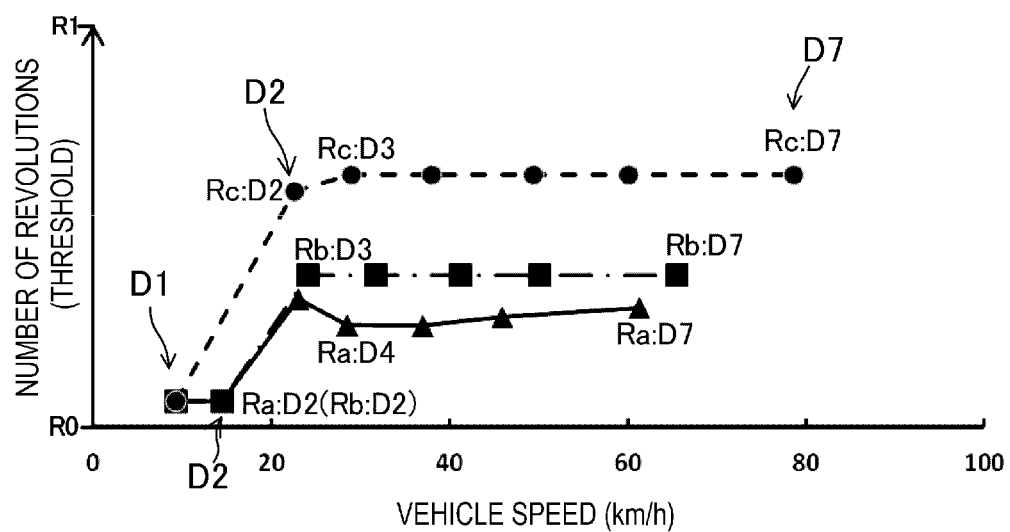
DOWNSHIFT SIDE

GEAR SHIFT CONTROL DEVICE OF VEHICLE

TECHNICAL FIELD

The disclosed technology relates to a gear shift control device of a vehicle including an engine and a motor as driving sources.

BACKGROUND ART

A control device for hybrid vehicles that relates to the disclosed technology is disclosed in JP2016-132432A.

Since a transmission is controlled by hydraulic pressure, the responsiveness thereof is low. Accordingly, the control device in JP2016-132432A calculates, during a gear shift, the torque that can be regenerated in consideration of the response delay. This improves fuel efficiency by increasing the control accuracy of the regenerative torque.

SUMMARY OF THE INVENTION

Problem to be Solved by the Invention

Improvement in fuel efficiency is an important issue for vehicles as in the technology disclosed in JP2016-132432A. For this purpose, in a vehicle having an engine and a motor as driving sources, the recovery efficiency of the energy consumed during deceleration needs to be improved by suppressing the fuel consumption of the engine and promoting regeneration using the motor.

In this respect, when a vehicle travels by being driven by the driving source, the consumption of fuel and electricity can be reduced by making the gear position of the transmission higher (that is, the gear ratio lower) and the number of revolutions on the input side lower with respect to the vehicle speed. Muffled noise can also be reduced. Accordingly, in terms of improvement in fuel efficiency and suppression of noise, the gear position is preferably held high in the shift pattern of the transmission during driving.

However, during regeneration, the amount of power generation becomes larger and the recovery efficiency of energy becomes higher by making the gear position of the transmission lower (that is, the gear ratio larger) and the number of revolutions on the input side of the transmission higher with respect to the vehicle speed. Accordingly, the recovery efficiency of regeneration energy decreases in a shift pattern for holding the gear position high. That is, in a shift pattern for holding the gear position high, fuel efficiency during driving can be improved, but fuel efficiency during regeneration degrades.

Furthermore, since the gear position is high, this shift pattern cannot perform rapid acceleration when the accelerator pedal is depressed to request the acceleration of the vehicle. Accordingly, the driver may not feel a comfortable travel feeling because of the difference from the expected acceleration.

The disclosed technology aims to achieve both improvement in fuel efficiency and comfortable traveling performance.

Means for Solving the Problem

The disclosed technology relates to a gear shift control device of a vehicle including an engine and a motor installed as driving sources and an automatic transmission provided between the driving sources and drive wheels, the automatic transmission performing a gear shift by switching between high and low gear positions through hydraulic control.

The gear shift control device includes memory storing a gear shift map that defines, for each of gear shift points, thresholds of the number of revolutions on a downshift side and on an upshift side to determine a switching start timing of each of the gear positions, a transmission control unit that switches between the gear positions based on the gear shift map, and a regeneration control unit that controls regeneration by the motor.

The gear shift map includes a cooperative regeneration map used in cooperative regeneration that cooperates with a brake, and a non-cooperative regeneration map used in other than cooperative regeneration, the non-cooperative regeneration map that defines the thresholds of revolutions lower than the thresholds in the cooperative regeneration map, and the non-cooperative regeneration map includes a first map that defines the thresholds of relatively low revolutions and is used when an accelerator is not used, and a second map that defines the thresholds of relatively high revolutions and is used when the accelerator is used.

That is, this gear shift control device applies to a vehicle (a so-called hybrid vehicle) having an engine and a motor as driving sources. Accordingly, as described above, to improve fuel efficiency, the fuel consumption of the engine needs to be suppressed and the recovery efficiency of the energy consumed during deceleration needs to be improved by promoting regeneration by the motor.

For this purpose, the gear position is preferably held higher in the shift pattern of the transmission during driving, but fuel efficiency during regeneration may degrade and a comfortable travel feeling may not be felt during acceleration. In contrast, in this gear shift control device, the gear shift map of the automatic transmission is devised so as to have three different shift patterns corresponding to the main operating states of the vehicle.

Specifically, first, the gear shift map includes the cooperative regeneration map used during cooperative regeneration and the non-cooperative regeneration map used during non-cooperative regeneration in which cooperative regeneration is not performed. In addition, the thresholds defined in the cooperative regeneration map have revolutions higher than the thresholds defined in the non-cooperative regeneration map.

Accordingly, when the cooperative regeneration map is used, the number of revolutions (more specifically, the number of revolutions on the input side of the automatic transmission) is held higher than the number of revolutions when the non-cooperative regeneration map is used. Since this enables the motor to rotate at relatively high revolutions, the amount of power generation by the motor becomes larger and the regenerative efficiency is improved. Accordingly, fuel efficiency during regeneration can be improved.

In contrast, the non-cooperative regeneration map includes the first map used when the accelerator is not used and the second map when the accelerator is used. In addition, the thresholds defined in the first map have revolutions lower than the thresholds defined in the second map. The first map is defined to improve fuel efficiency and the second map is defined for comfortable traveling performance.

The non-cooperative regeneration map is used when, for example, the vehicle accelerates or travels at a constant speed (power travel) or when deceleration regeneration is performed not in cooperation with the brake. Since relatively low revolutions are performed when the first map is used, the outputs of the engine and the motor become low, and the consumption of fuel and electricity can be suppressed. Muffled noise that is generated due to an increase in the number of revolutions can also be reduced.

However, since the number of revolutions is low when the first map is used, a comfortable travel feeling may not be felt due to insufficient torque when rapid acceleration is performed by the accelerator. In contrast, this gear shift control device can moderately enhance the number of revolutions by using the second map. This increases the torque to be output and enables acceleration in a shorter time. The driver can obtain the imaged acceleration and feel a comfortable travel feeling.

Accordingly, both the overall improvement in fuel efficiency and the comfortable traveling performance can be achieved.

The thresholds of high gear shift points higher than a predetermined low gear shift point may be defined to be an identical value on the downshift side in the cooperative regeneration map and the second map.

This performs a downshift at the identical number of revolutions even when the vehicle speed differs in a wide range of the operating region of the vehicle. Accordingly, the driver is less likely to feel discomfort without losing a comfortable travel feeling. Both the improvement in fuel efficiency and the comfortable traveling performance can be achieved at a high level.

The gear shift control device may further include a relay clutch control unit that controls a relay clutch, the relay clutch may be included in the vehicle, the relay clutch being provided between the engine and the automatic transmission to enable the engine to be disconnected from the automatic transmission, the relay clutch control unit may perform deceleration regeneration start processing that disconnects the relay clutch in a predetermined high speed position during deceleration and performs deceleration regeneration end processing that connects the disconnected relay clutch, the deceleration regeneration end processing may include processing that connects the relay clutch before switching at a predetermined low gear shift point by using the non-cooperative regeneration map, and, in the non-cooperative regeneration map, a difference between the thresholds of the predetermined low gear shift point and one of the gear shift points that is higher than the predetermined low gear shift point by one level may be defined to be larger than differences among the other gear shift points.

As described in more detail below, when the deceleration regeneration end processing that connects the relay clutch before switching at a predetermined low gear shift point by using the non-cooperative regeneration map, a torque shock occurs during the switching at the low gear shift point. When this torque shock is large, the driver may feel discomfort. Accordingly, the torque shock needs to be suppressed by starting the engine while connecting the relay clutch and adding an engine torque.

However, it takes time to perform a series of processes described above. In contrast, in this gear shift control device, the difference between thresholds of the predetermined low gear shift point and the gear shift point higher than the predetermined low gear shift point by one level is defined to be larger than the differences among the other gear shift points. Accordingly, the time required for suppressing a torque shock can be obtained sufficiently, so a torque shock can be suppressed in a stable and effective manner.

The thresholds of a lowest gear shift point in the non-cooperative regeneration map and a lowest gear shift point in the cooperative regeneration map may be defined to be an identical value.

This enables switching at the identical speed and the identical number of revolutions during a gear shift at the lowest vehicle speed. Accordingly, the driver is less likely to feel discomfort without losing a comfortable travel feeling. Both the improvement in fuel efficiency and the comfortable traveling performance can be achieved at a high level.

When the gear shift points on the downshift side and the upshift side that have an identical gear position in the gear shift map are compared with each other, the thresholds on the upshift side are defined larger than the thresholds on the downshift side, and when a transition between the downshift side and the upshift side is first performed, an identical gear shift map may be used.

As a result, when a gear shift is first performed after turning from acceleration to deceleration or from deceleration to acceleration, the identical map is used without a transition to a different map. Furthermore, when the gear shift points with the same gear position on both the downshift side and the upshift side are compared with each other, the thresholds on the upshift side are defined to be larger than the thresholds on the downshift side. Therefore, the same gear position is used and no shift change is performed until the vehicle decelerates or accelerates at a predetermined speed.

Accordingly, complicated gear shifts can be suppressed and the driver is less likely to feel discomfort. Both the improvement in fuel efficiency and the comfortable traveling performance can be achieved at a high level.

Advantage of the Invention

According to the gear shift control device of the vehicle to which the disclosed technology has been applied, both the improvement in fuel efficiency and the comfortable traveling performance can be achieved.

BRIEF DESCRIPTION OF THE DRAWINGS

FIG. 2 illustrates an engagement table of an automatic transmission.

FIG. 6 is a schematic diagram illustrating an example of a gear shift map.

FIG. 7 is a diagram graphically illustrating the thresholds of gear shift points in the gear shift map.

MODES FOR CARRYING OUT THE INVENTION

The disclosed technology will be described below. However, the following descriptions are only examples essentially.

<Vehicle>

Figure 1:
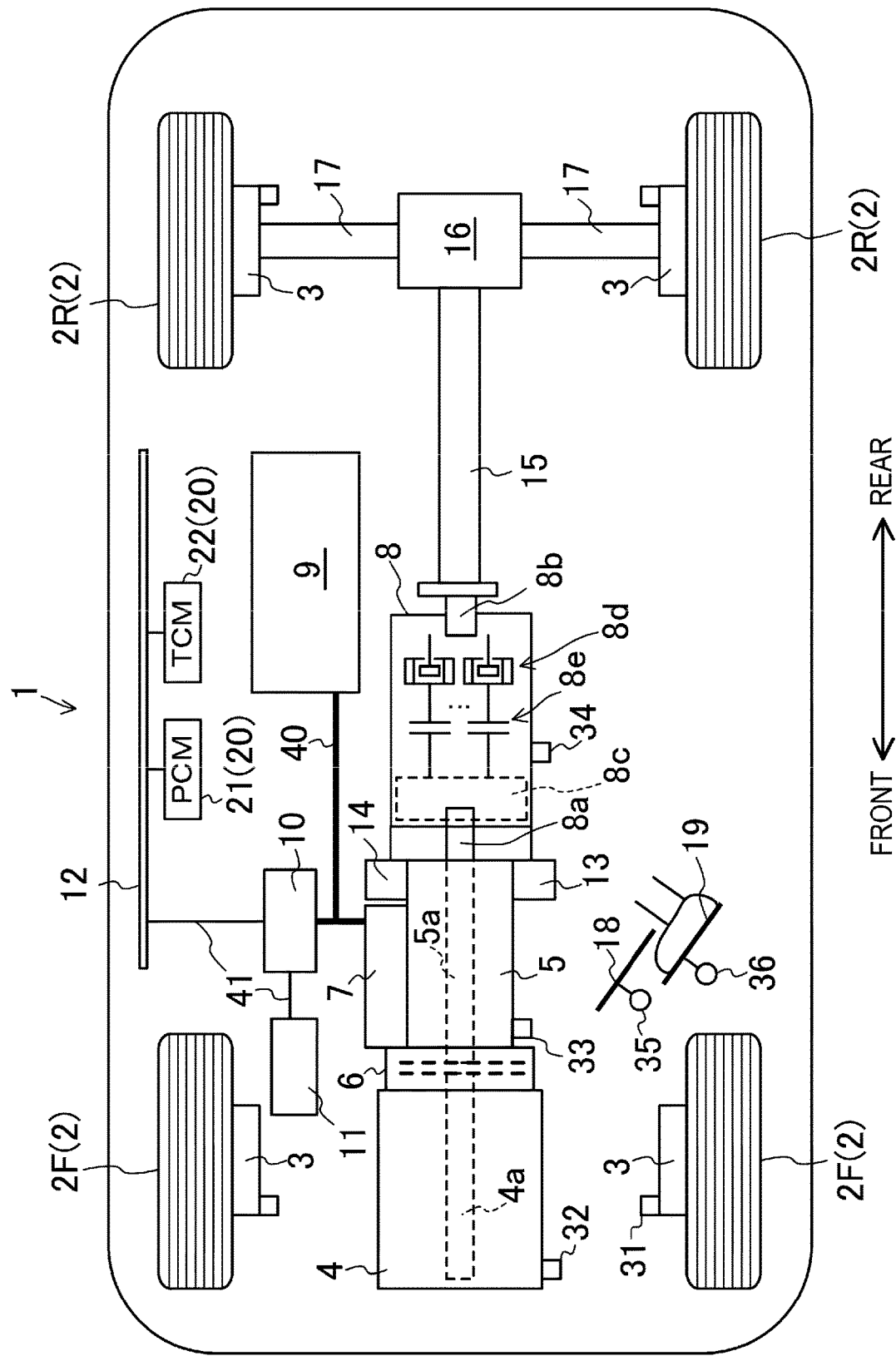
FIG. 1 a schematic diagram illustrating the main structure of an automobile to which the disclosed technology has been applied.

FIG. 1 illustrates an automobile 1 (an example of a vehicle) to which the disclosed technology has been applied. This automobile 1 is a hybrid vehicle capable of traveling by using electricity. The automobile 1 has four wheels 2 (2F, 2F, 2R, and 2R). Each of the wheels 2 has a brake 3 for braking the rotation thereof.

An engine 4 and a driving motor 5 are installed as driving sources of the automobile 1. The driving sources work together to drive the two wheels (drive wheels 2R) symmetrically disposed among the four wheels 2F, 2F, 2R, and 2R. This causes the automobile 1 to travel. The driving motor 5 is also used as a generator during regeneration in addition to a driving source.

This automobile 1 has a high voltage battery 9 having a rated voltage of 50 V or less, as described later. The driving motor 5 operates by mainly assisting the engine 4 due to electricity supplied from the high voltage battery 9 (a so-called mild hybrid vehicle). It should be noted that the automobile 1 may be a so-called plug-in hybrid vehicle that can receive an electricity supply from an external power source.

In this automobile 1, the engine 4 is disposed in the front portion of the vehicle body and the drive wheels 2R are disposed in the rear portion of the vehicle body. That is, this automobile 1 is a so-called front-engine, rear-wheel drive (FR) vehicle. The automobile 1 is not limited to a FR vehicle and may be a four-wheel drive vehicle.

The automobile 1 includes a relay clutch 6, an inverter 7, an automatic transmission 8, and the like as driving devices in addition to the engine 4 and the driving motor 5. The automobile 1 also includes a powertrain control module (PCM) 21, a transmission control module (TCM) 22, and the like as control devices.

Vehicle speed sensors 31, an engine sensor 32, a motor sensor 33, a transmission sensor 34, a brake sensor 35, an accelerator sensor 36, and the like are also installed in the automobile 1 in conjunction with the control devices.

(Driving Devices)

The engine 4 is, for example, an internal combustion engine that uses gasoline as fuel for combustion. In addition, the engine 4 is a so-called four-cycle engine that generates rotative power by repeating an intake stroke, a compression stroke, an expansion stroke, and an exhaust stroke. The engine 4 may have various types and forms, such as a diesel engine and the like, but the disclosed technology does not particularly limit the type or form of the engine 4.

In this automobile 1, the engine 4 is disposed substantially in the middle in the vehicle width direction with a crank shaft 4a that outputs rotative power aligned in the front and rear directions of the vehicle body. Various devices and mechanisms regarding the engine 4, such as an intake system, an exhaust system, and a fuel supply system, are installed in the automobile 1, but these are not illustrated or described.

The driving motor 5 is a permanent magnet synchronous motor driven by three-phase alternating current. The driving motor 5 is disposed in series with the engine 4 via the relay clutch 6 behind the engine 4. The driving motor 5 is also disposed in series with the automatic transmission 8 in front of the automatic transmission 8.

The relay clutch 6 intervenes between the front end portion of a shaft 5a of the driving motor 5 and the crank shaft 4a of the engine 4. The state of the relay clutch 6 can switch between the state (connected state) in which the crank shaft 4a and the shaft 5a are coupled to each other and the state (disconnected state) in which the crank shaft 4a and the shaft 5a are disconnected from each other depending on the presence or absence of the engagement of the friction engagement element.

The rear end portion of the shaft 5a of the driving motor 5 is coupled to an input shaft 8a of the automatic transmission 8. Accordingly, the engine 4 is coupled to the automatic transmission 8 via the relay clutch 6 and the shaft 5a. The engine 4 is disconnected from the automatic transmission 8 by placing the relay clutch 6 in the disconnected state.

Although described in more detail below, during a travel of the automobile 1, the relay clutch 6 is switching between the connected state and the disconnected state. For example, during deceleration of the automobile 1, regeneration is performed with the engine 4 disconnected by placing the relay clutch 6 in the disconnected state.

Then, when deceleration regeneration is performed in cooperation with the brakes 3 (during cooperative regeneration), the relay clutch 6 is connected before the vehicle stops (before the number of revolutions of the shaft 5a becomes zero). When deceleration regeneration is performed not in cooperation with the brake (during non-cooperative regeneration), the relay clutch 6 is connected at the timing at which the shaft 5a reaches a predetermined number of revolutions.

That is, when the relay clutch 6 is connected during non-cooperative regeneration, a certain number of revolutions is required to prevent engine stall when the vehicle turns to accelerate. The number of revolutions at which the relay clutch 6 is connected is set to not less than a value obtained by adding the lower limit number of revolutions at which engine stall may occur to the reduction in the number of revolutions that corresponds to the time required for gear shift control and the startup of the engine 4.

The driving motor 5 is connected to the high voltage battery 9, which is installed in the vehicle as the driving power supply via the inverter 7 and a high voltage cable 40. This automobile 1 has, as the high voltage battery 9, a DC battery having a rated voltage of 50 V or lower, specifically 48 V.

The high voltage battery 9 supplies high voltage DC power to the inverter 7. The inverter 7 converts this DC power to three-phase AC power and supplies the converted AC power to the driving motor 5. This rotationally drives the driving motor 5.

The high voltage battery 9 is also connected to a DC-to-DC converter 10 via the high voltage cable 40. The DC-to-DC converter 10 converts the DC power having a high voltage of 48 V to DC power having a low voltage of 12 V and outputs the converted power. The DC-to-DC converter 10 (specifically, the output side thereof) is connected to a low voltage battery 11 (so-called lead acid battery) via a low voltage cable 41.

Although not illustrated, the low voltage battery 11 is connected to various electrical components via the low voltage cables 41. The DC-to-DC converter 10 is also connected to a controller area network (CAN) 12 via the low voltage cable 41. This causes the DC-to-DC converter 10 to supply low voltage DC power to the CAN 12.

The automatic transmission 8 is a multistage automatic transmission (so-called AT). The automatic transmission 8 has the input shaft 8a in the front end portion thereof, and the input shaft 8a thereof is coupled to the shaft 5a of the driving motor 5 as described above. The automatic transmission 8 has, in the rear end portion thereof, an output shaft 8b that rotates independently of the input shaft 8a.

A gear shift mechanism including a torque converter 8c, a plurality of planetary gear mechanisms 8d, and a plurality of transmission clutches 8e, and the like is built into the portion between the input shaft 8a and the output shaft 8b. Each of the transmission clutches 8e has a plurality of friction engagement elements that switch between the engage state and the non-engagement state due to a hydraulic pressure.

By switching between the transmission clutches 8e of the transmission mechanism through hydraulic control, it is possible to switch between forward travel and backward travel and to make the number of revolutions of the input shaft 8a different from the number of revolutions of the output shaft 8b of the automatic transmission 8, that is, to switch between gear positions.

For example, the input side of each of the transmission clutches 8e can be coupled to the input shaft 8a via the torque converter 8c. The output side of each of the transmission clutches 8e is coupled to the output shaft 8b via the corresponding planetary gear mechanism 8d.

After that, when a particular transmission clutch 8e is selected and a predetermined hydraulic pressure is supplied to this transmission clutch 8e, the friction engagement elements of the transmission clutch 8e are engaged. This causes the input shaft 8a to be coupled to the output shaft 8b via the transmission clutch 8e and the corresponding planetary gear mechanism 8d.

On the other hand, when the hydraulic pressure supplied to the transmission clutch 8e is recovered, the friction engagement elements of the transmission clutch 8e are disconnected. This disconnects, from each other, the input shaft 8a and the output shaft 8b having been coupled to each other via the transmission clutch 8e and the corresponding planetary gear mechanism 8d.

A mechanical oil pump (MOP) 13 driven by the driving source (engine 4 and/or driving motor 5) and an electric oil pump (EOP) 14 driven by electricity are attached to the automatic transmission 8 to supply the hydraulic pressure to the automatic transmission 8. The EOP 14 is connected to the low voltage battery 11 and operates on electricity supplied by the low voltage battery 11.

FIG. 2 illustrates the engagement table of the automatic transmission 8. Circle symbols in the table indicate engagement. This automatic transmission 8 incorporates five transmission clutches 8e including three clutch elements of a first clutch CL1, a second clutch CL2, and a third clutch CL3 and two brake elements of a first brake BR1 and a second brake BR2.

The automatic transmission 8 selects three transmission clutches 8e from these five transmission clutches 8e using hydraulic control and engages the three transmission clutches 8e. This performs switching to one of the first to eight gear positions for forward travel and the reverse gear position for reverse travel (reverse speed).

For example, in the first gear, the first clutch CL1, the first brake BR1, and the second brake BR2 are engaged. In an upshift from the first gear, switching from the first gear to the second gear is performed by engaging the second clutch CL2 instead of the first clutch CL1. Switching from the second gear to the third gear is performed by engaging the first clutch CL1 instead of the first brake BR1. Switching from the third gear to the fourth gear is performed by engaging the third clutch CL3 instead of the first clutch CL1.

An upshift to the fifth and higher gears is performed in the same way. In a downshift, the procedure of switching for an upshift is reversed.

The higher the gear position, the smaller the gear ratio. For example, the second gear has a smaller gear ratio than the first gear. Generally, a low gear position is used for a low speed travel and a high speed position is used for a high speed travel. During a travel of the automobile 1, the automatic transmission 8 switches between the high and low gear positions from the first gear to the eighth gear, changes the number of revolutions input from the driving source, and output the changed number of revolutions.

It should be noted that, when the transmission clutches 8e are not engaged, the input shaft 8a and the output shaft 8b are disconnected from each other (so-called the neutral). Even when rotative power is input from the driving source into the automatic transmission 8, the rotative power is not output from the automatic transmission 8.

As illustrated in FIG. 1, the output shaft 8b of the automatic transmission 8 is coupled to a differential gear 16 via a propeller shaft 15 that extends in the front and back directions of the vehicle body. A pair of drive shafts 17 and 17, extending in the vehicle width direction, that are coupled to the left and right drive wheels 2R and 2R is coupled to the differential gear 16. The rotative power output through the propeller shaft 15 is distributed by the differential gear 16 and then transferred to the drive wheels 2R through the pair of drive shafts 17 and 17.

(Gear Shift Control Device)

The automobile 1 has the PCM 21 and TCM 22 that control the engine 4, the driving motor 5, the relay clutch 6, the automatic transmission 8, and the like and control the travel of the automobile 1 in response to an operation by the driver. Each of the PCM 21 and the TCM 22 includes hardware, such as a processor, memory, and an interface, and software, such as a database and a control program. The TCM 22 includes memory 22c.

The PCM 21 is the unit that controls mainly the operation of the driving sources (engine 4 and driving motor 5). The PCM 21 also controls the operations of the brakes 3. The TCM 22 is the unit that controls mainly the operations of the relay clutch 6 and the automatic transmission 8. The PCM 21 and the TCM 22 are connected via the CAN 12 as described above so as to be electrically communicable with each other. A gear shift control device 20 includes the PCM 21 and the TCM 22.

Figure 3:
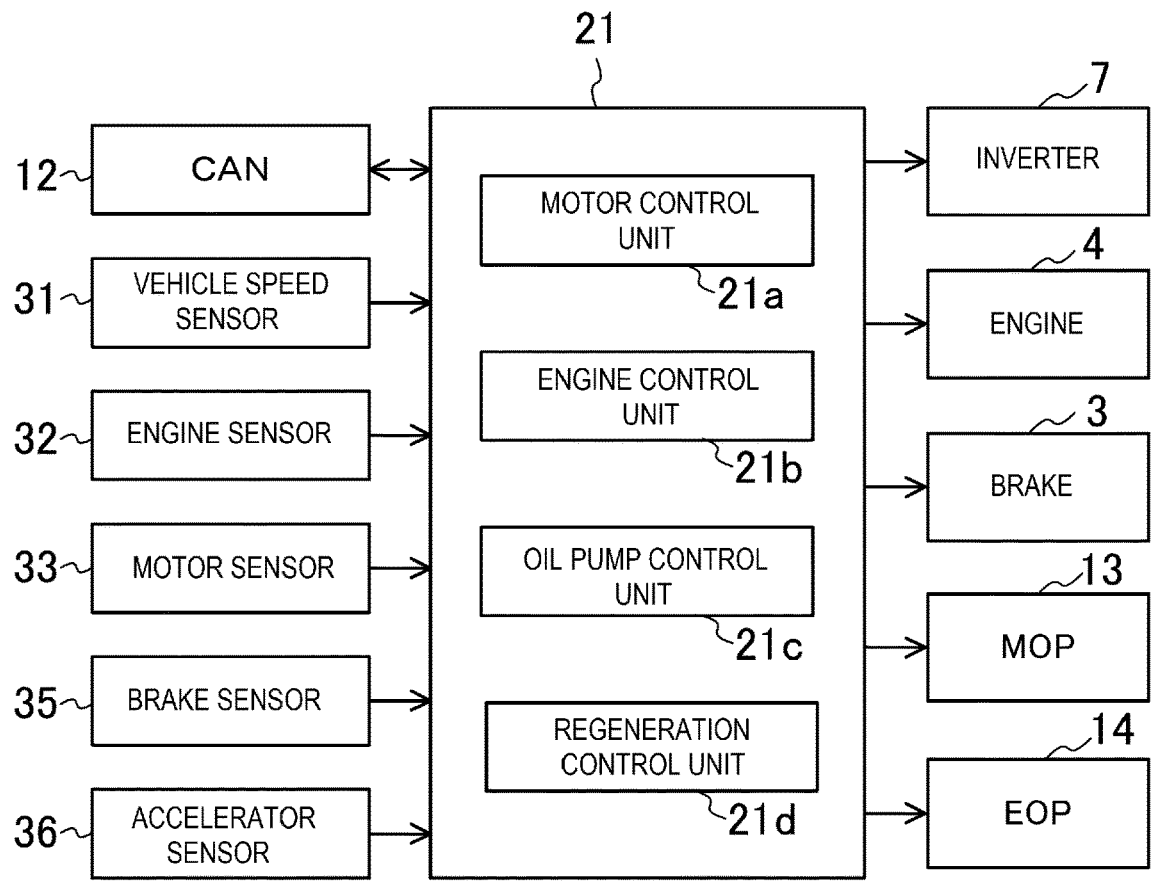
FIG. 3 is a block diagram illustrating a powertrain control module (PCM) and main input and output devices relating to the PCM.

FIG. 3 illustrates the PCM 21 and main input and output devices relating thereto. The vehicle speed sensors 31, the engine sensor 32, the motor sensor 33, the brake sensor 35, the accelerator sensor 36, the inverter 7, the engine 4, the brakes 3, the MOP 13, the EOP 14, and the like are connected to the PCM 21 in addition to the CAN 12. The PCM 21 includes the following functional components: a motor control unit 21a, an engine control unit 21b, an oil pump control unit 21c, a regeneration control unit 21d, and the like as hardware and software thereof.

The motor control unit 21a has the function of controlling the driving of the driving motor 5 and causes the driving motor 5 to output required rotative power by controlling the inverter 7. The engine control unit 21b has the function of controlling the driving of the engine 4 and causes the engine 4 to output the required rotative power.

The oil pump control unit 21c has the function of controlling the operation of the MOP 13 and the EOP 14 and adjusts the hydraulic pressure supplied to the automatic transmission 8. The regeneration control unit 21d has the function of controlling regeneration and, for example, performs regeneration (cooperative regeneration) by using the driving motor 5 in cooperation with the brakes 3 when the automobile 1 decelerates.

Figure 4:
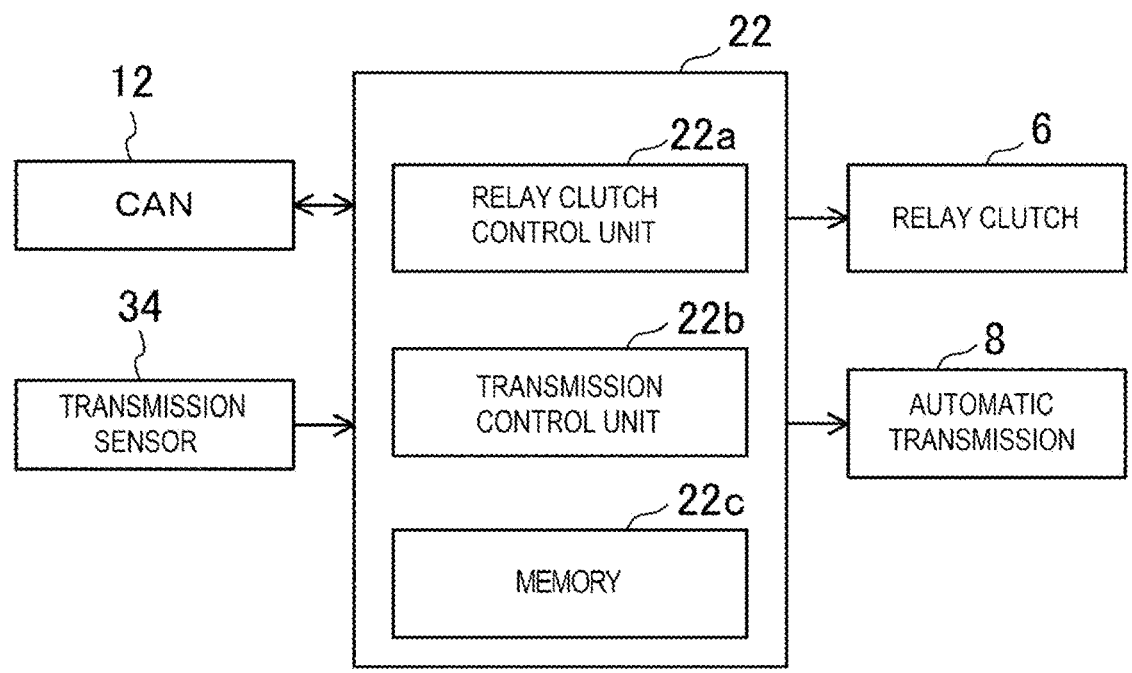
FIG. 4 is a block diagram illustrating a transmission control module (TCM) and main input and output devices relating to the TCM.

FIG. 4 illustrates the TCM 22 and the main input and output devices relating thereto. In addition to the CAN 12, the transmission sensor 34, the relay clutch 6, the automatic transmission 8, and the like are connected to the TCM 22. The TCM 22 has the following functional components: a relay clutch control unit 22a and a transmission control unit 22b as hardware and software thereof.

The relay clutch control unit 22a controls the operation of the relay clutch 6. That is, the relay clutch control unit 22a switches the state of the relay clutch 6 between the connected state and the disconnected state in accordance with the operating state of the automobile 1. The transmission control unit 22b switches the gear position of the automatic transmission 8 based on a predetermined gear shift map 50 described later in accordance with the operating state of the automobile 1. That is, the transmission control unit 22b changes the number of revolutions to be output with respect to the number of revolutions to be input to the automatic transmission 8.

As illustrated in FIG. 1, the vehicle speed sensors 31 are attached to, for example, the wheels 2, respectively, and detect the number of revolutions of the wheels 2 and output the detected values to the PCM 21. The PCM 21 calculates the vehicle speed based on the detected values. The engine sensor 32 is attached to the engine 4 and detects the number of revolutions and the torque of the engine 4 and outputs the detected values to the PCM 21. The motor sensor 33 is attached to the driving motor 5 and detects the number of revolutions and the torque of the driving motor 5 and outputs the detected number of revolutions and the detected values to the PCM 21.

The brake sensor 35 is attached to a brake pedal 18, detects the amount of depression thereof, and outputs the detected value to the PCM 21. The accelerator sensor 36 is attached to an accelerator pedal 19, detects the amount of depression thereof, and outputs the detected value to the PCM 21. The transmission sensor 34 is attached to the automatic transmission 8, detects the number of revolutions and the engagement torques of the transmission clutches 8e, the number of revolutions of the output shaft 8b, and the like and outputs the detected values to the TCM 22.

The automobile 1 travels by causing the PCM 21 and the TCM 22 to work together for controlling the devices of the drive system based on the detected values input from these sensors. This automobile 1 travels by using the engine 4 and the driving motor 5 together. For example, the driving motor 5 assists the output of the engine 4 when the automobile 1 starts or accelerates. When the vehicle speed has reached a medium speed range or a high speed range and the automobile 1 is traveling stably, the automobile 1 is traveling by being driven by both the engine 4 and the driving motor 5 or by being driven only by the driving motor 5 with the engine 4 disconnected.

In addition, in the automobile 1, when the automobile 1 decelerates, then the engine 4 is disconnected and deceleration regeneration is actively performed by the driving motor 5 while braking is performed through cooperated control with the brakes 3 depending on the situation. This causes the automobile 1 to improve fuel efficiency by recovering more energy from the energy consumed during deceleration.

<Travel Example of the Vehicle>

Figure 5:
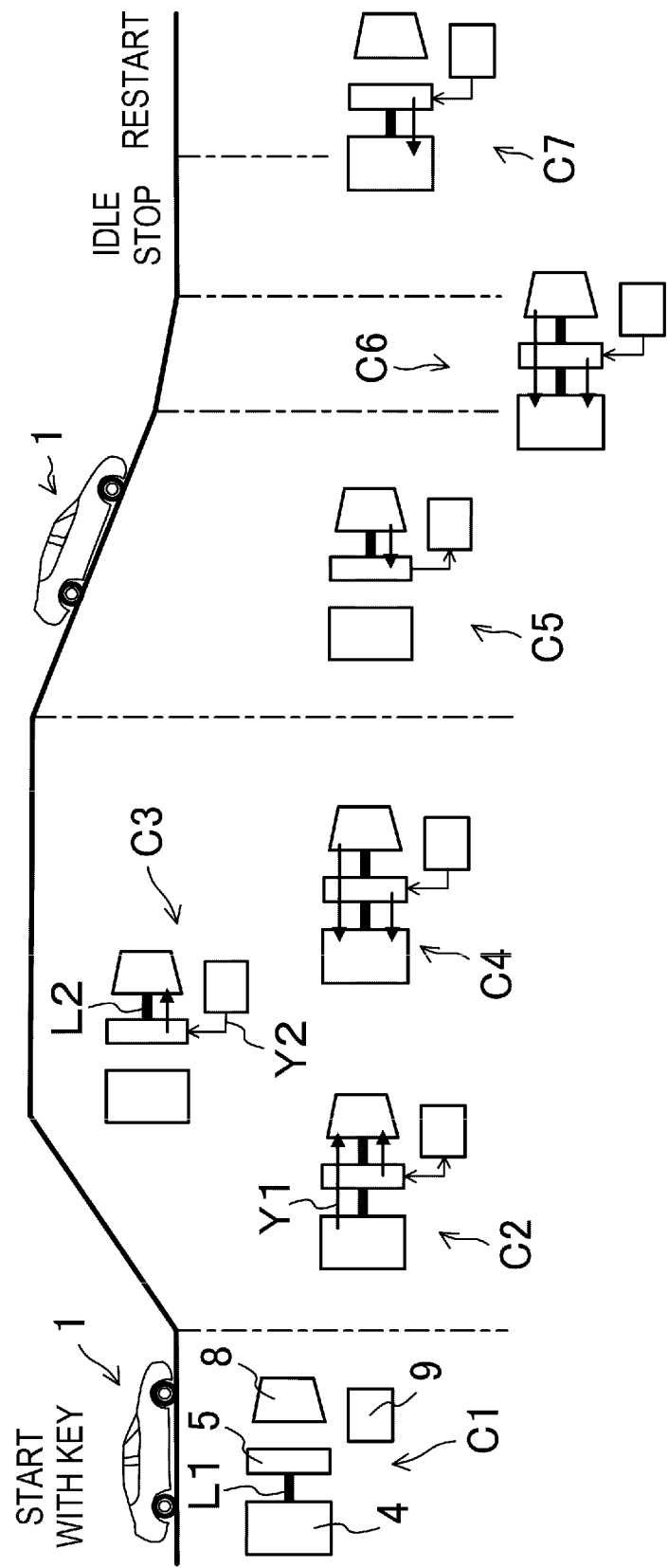
FIG. 5 is a diagram for describing a basic travel example of the automobile.

FIG. 5 illustrates a basic travel example of the automobile 1. The upper portion of the figure illustrates the travel state (changes in the vehicle speed) of the automobile 1. State diagrams C1 to C7 illustrated in the lower portion of the figure indicate the presence or absence of the engagement of the relay clutch 6 and the transmission clutch 8e, which corresponds to the travel state of the automobile 1, the output state of the rotative power (torque or load), and the supply state of electricity.

Solid lines L1 indicate the presence or absence of the engagement of the relay clutch 6, and solid lines L2 indicate the presence or absence (that is, the neutral or not) of the engagement of the transmission clutch 8e. Bold arrows Y1 indicate the output of the rotative power from the driving source (engine 4 and/or driving motor 5), and narrow arrows Y2 indicate the input and output of electricity from the high voltage battery 9 to the driving motor 5.

The state in which the automobile 1 has completely stopped is indicated at the left end in FIG. 5. In this automobile 1, a key operation by the driver or the like operates a cell motor and starts the engine 4. At this time, the relay clutch 6 is in the connected state as illustrated in the state diagram C1 and the automatic transmission 8 is in the neutral state.

Next, when the accelerator is depressed and the automobile 1 starts traveling, the automatic transmission 8 is coupled in a low gear position as illustrated in the state diagram C2, and the rotative power is output from the engine 4 according to the amount of depression of the accelerator. At this time, the driving motor 5 assists the driving by the engine 4. Specifically, the driving motor 5 performs a drive, a stop, or power generation (regeneration) by adjusting the rotative power output to the automatic transmission 8 by the engine 4 to optimize fuel efficiency.

After the automobile 1 starts traveling, in accordance with the operating state thereof, the automobile 1 travels by being driven by both the engine 4 and the driving motor 5 (hybrid electric vehicle (HEV) travel) (the state in the state diagram C2) or the automobile 1 travels by being driven by only the driving motor 5 with the engine 4 disconnected (electric vehicle (EV) travel) (the state in the state diagram C3). At this time, a high speed position is set in the automatic transmission 8 to suppress the consumption of fuel and electricity. Accordingly, fuel efficiency improves. Since the number of revolutions is low, muffled noise can also be reduced. Accordingly, noise can be reduced.

In particular, in this automobile 1, EV travel has priority in the operating region in which EV travel is possible. Since the engine 4 stops in EV travel, no fuel is consumed. No energy loss due to combustion is caused. Accordingly, fuel efficiency can be further improved.

The engine 4 is disconnected during a travel of the automobile 1 in the cases in which EV travel is performed as described above and deceleration regeneration is performed as described later. On the other hand, the engine 4 is coupled in the cases in which the automobile 1 travels in an operating region where EV travel is disabled, an idle stop is made, there is a request for increasing the output due to use of an air conditioner, and there is a regenerative request to charge the high voltage battery 9.

When the operating state returns from EV travel to HEV travel, the engine 4 is coupled as illustrated in the state diagram C4, and the engine 4 is restarted by the inertia of the automobile 1 that is traveling and the rotative power driven by the driving motor 5.

Then, when the automobile 1 starts decelerating to stop, this automobile 1 performs deceleration regeneration with the engine 4 disconnected as illustrated in the state diagram C5. More energy can be recovered by disconnecting the engine 4.

When the vehicle speed decreases significantly and the automobile 1 nearly stops, in this automobile 1, the engine 4 is coupled as illustrated in the state diagram C6 to prepare for an idle stop.

That is, the relay clutch 6 in the disconnected state is connected when the gear position of the automatic transmission 8 is in a low gear position. In an idle stop, the engine 4 can be restarted immediately by being driven by the driving motor 5 even if the automobile 1 stops. At an idle stop, the automatic transmission 8 is in neutral and the automobile 1 is in the state indicated by the state diagram C1.

When the automobile 1 in the idle stop state is restarted, the driving motor 5 is driven by the electricity supply from the high voltage battery 9, as illustrated in the state diagram C7. The engine 4 is started by the rotative power thereof. Accordingly, the engine 4 can be restarted smoothly with low noise.

<Gear Shift Map>

As described above, during a travel of the automobile 1, the gear position of the automatic transmission 8 is preferably set to a high speed position in terms of the improvement in fuel efficiency and the suppression of noise.

However, since the number of revolutions of the shaft 5a is low when the automatic transmission 8 is in a high speed position, the amount of power generation during regeneration by the driving motor 5 is suppressed. Accordingly, the recovery efficiency of energy decreases and fuel efficiency degrades.

In addition, when the accelerator pedal 19 is depressed to request the rapid acceleration of the automobile 1, if the automatic transmission 8 is a high speed position, the torque is insufficient and cannot respond to the request. Accordingly, the driver may not feel a comfortable travel feeling because of the difference from the imaged acceleration.

In contrast, the gear shift map 50 that defines the shift patterns of the automatic transmission 8 of the automobile 1 are devised to achieve both the improvement in fuel efficiency and the comfortable traveling performance. FIG. 6 illustrates the gear shift map 50. The gear shift map 50 is stored in the memory 22c of the TCM 22. The data form thereof is not limited to a table and may be a formula, a group of values, or the like, and may be selected according to the specification.

The gear shift map 50 mainly includes three different maps. That is, the gear shift map 50 includes a regeneration request map 51, a combustion request map 52, and a travel request map 53. The regeneration request map 51 is used during cooperative regeneration, that is, when deceleration regeneration is performed in cooperation with the brakes 3, and is an example of a cooperative regeneration map in the present disclosure.

The combustion request map 52 and the travel request map 53 are used during non-cooperative regeneration, that is, in the case other than cooperative regeneration. For example, these maps are used when the automobile 1 accelerates and travels at a constant speed (power travel) and when automobile 1 performs deceleration regeneration not in cooperation with the brakes 3, and is an example of a non-cooperative regeneration map in the present disclosure. The combustion request map 52 also is an example of a first map in the present disclosure, and the travel request map 53 also is an example of a second map in the present disclosure.

These maps define, for each of the gear shift points, the thresholds for determining the timings (switching start timings) at which switching of the gear position starts for both the upshift side and the downshift side. That is, gear shift points U1 to U7 are defined as a plurality of switching points for switching between high and low gear positions on the upshift side, and gear shift points D1 to D7 are defined on the downshift side.

For each of these gear shift points, the minimum number of revolutions (the number of revolutions on the input side of the automatic transmission 8) at which the gear position switches are defined, as the threshold, together with the corresponding vehicle speed. It should be noted that the threshold is not limited to the number of revolutions but may be any other value correlated with the number of revolutions.

On the upshift side in the combustion request map 52, the vehicle speed at which the gear position starts switching and the number of revolutions (one of Ra:U1 to Ra:U7) corresponding thereto are defined for each of the gear shift points U1 to U7. For example, switching from the third gear to the fourth gear is performed at the gear shift point U3 in the combustion request map 52. Accordingly, when the vehicle speed of the automobile 1 travelling at the third gear increases to 30 km/h and the number of revolutions reaches Ra:U3, the gear position switches to the fourth gear at this timing to perform an upshift.

In addition, on the downshift side in the regeneration request map 51, the vehicle speed at which the gear position starts switching and the number of revolutions (one of Rc:D1 to Rc:D7) corresponding thereto are defined for each of the gear shift points D1 to D7. For example, the gear position switches from the third gear to the second gear at the gear shift point D2 in the regeneration request map 51. Accordingly, when the vehicle speed of the automobile 1 travelling at the third gear decreases to 23 km/h and the number of revolutions becomes Rc:D2, the gear position switches to the second gear at this timing to perform a downshift.

FIG. 7 graphically illustrates the thresholds of gear shift points in these maps. The dashed line corresponds to the regeneration request map 51, the dot-dash line corresponds to the travel request map 53, and the solid line corresponds to the combustion request map 52. The elements of these lines indicate the gear shift points (some of the elements are denoted by the corresponding thresholds). The vertical axis represents the threshold and each of R0 and R1 indicates a predetermined number of revolutions.

The thresholds defined in the regeneration request map 51 have revolutions higher than the thresholds defined in the combustion request map 52 and the travel request map 53. That is, the number of revolutions in the regeneration request map 51 is set to be held higher than those in the combustion request map 52 and the travel request map 53.

For example, when comparison is made at the gear shift point D7 on the downshift side, switching from the eighth gear to the seventh gear is performed when the number of revolutions reaches Rc:D7 in the regeneration request map 51. In contrast, switching from the eighth gear to the seventh gear is performed when the number of revolutions reaches Rb:D7, which is lower than Rc:D7, in the travel request map 53. In the combustion request map 52, the switching is performed at the number of revolutions of Ra:D7, which is even lower than Rb:D7.

Therefore, according to the regeneration request map 51, the driving motor 5 can rotate at relatively high revolutions, so the amount of power generation becomes larger and the regenerative efficiency improves. Accordingly, fuel efficiency during regeneration can be improved.

In contrast, the thresholds defined in the combustion request map 52 have revolutions lower than the thresholds defined in the travel request map 53. That is, the thresholds defined in the combustion request map 52 have relatively low revolutions and the thresholds defined in the travel request map 53 have relatively high revolutions. In the travel request map 53, the number of revolutions is set to be held higher than that in the combustion request map 52.

The combustion request map 52 is set to give priority to the improvement in fuel efficiency. In contrast, the travel request map 53 is set to give priority to the comfortable traveling performance. The combustion request map 52 is mainly used when the accelerator is not used and the travel request map 53 is mainly used when the accelerator is used.

For example, at the gear shift point U7, switching from the seventh gear to the eighth gear is performed when the number of revolutions reaches Ra:U7 in the combustion request map 52. In contrast, in the travel request map 53, switching from the seventh gear to the eighth gear is performed when the number of revolutions reaches Rb:U7, which is higher than Ra:U7.

Accordingly, since relatively low revolutions are performed in the combustion request map 52, the outputs of the engine 4 and the driving motor 5 become lower and the consumption of fuel and electricity can be suppressed. Muffled noise that is generated due to an increase in the number of revolutions can also be reduced.

In contrast, since relatively high revolutions are performed in the travel request map 53, the torque that can be output becomes larger and acceleration can be performed in a shorter time. Accordingly, the driver can obtain an imaged acceleration and feel a comfortable travel feeling.

On the downshift side in the cooperative regeneration map 51 and the travel request map 53, the thresholds of the gear shift points that are higher than a predetermined low gear shift point are defined to be the same value.

Specifically, the same threshold (Rc:D3 to Rc:D7 are the same value) is defined for the gear shift points other than the gear shift points D1 and D2 in the regeneration request map 51, that is, the gear shift points equal to or larger than the gear shift point D3. Similarly, the same threshold is defined for the gear shift points equal to or more than the gear shift point D3 in the travel request map 53 (Rb:D3 to Rb:D7 are the same value).

This performs a downshift at the same number of revolutions even when the vehicle speed differs in a wide range of the operating region of the automobile 1. Accordingly, the driver is less likely to feel discomfort without losing a comfortable travel feeling. Both the improvement in fuel efficiency and the comfortable traveling performance can be achieved at a high level.

The thresholds of the gear shift points equal to or smaller than a predetermined low gear shift point (specific gear shift point D2 described later) on the downshift side in both the combustion request map 52 and the travel request map 53 as well as the vehicle speeds are defined to be the same value. In addition, the thresholds of the gear shift points equal to or smaller than a predetermined low gear shift point on the upshift side in both the combustion request map 52 and the travel request map 53 as well as the vehicle speeds are defined to be the same value in both maps.

Specifically, the thresholds of the gear shift points D1 and D2 in the combustion request map 52 and the thresholds of the gear shift points D1 and D2 in the travel request map 53 as well as the vehicle speeds are defined to be the same value (Ra:D1=Rb:D1 and Ra:D2=Rb:D2). In addition, the threshold of the gear shift point U1 in the combustion request map 52 as well as the threshold and the vehicle speed of the gear shift point U1 in the travel request map 53 is defined to be the same value (Ra:U1=Rb:U1), and the threshold of the gear shift point U2 in the combustion request map 52 as well as the threshold and the vehicle speed of the gear shift point U2 in the travel request map 53 is defined to be the same value (Ra:U2=Rb:U2).

Accordingly, even if different maps are used during different gear shifts when the vehicle speed is low, an upshift or a downshift is performed at the same vehicle speed and the same number of revolutions. Accordingly, even when the automobile 1 accelerates or decelerates frequently in combination with a gear shift, the driver is less likely to feel discomfort without losing a comfortable travel feeling. Both the improvement in fuel efficiency and the comfortable traveling performance can be achieved at a high level.

The thresholds at the lowest gear shift points in these maps (combustion request map 52, travel request map 53, and regeneration request map 51) are defined to be the same value.

That is, the lowest gear shift points D1 on the downshift side in the maps as well as the vehicle speeds are defined to be the same threshold (Ra:D1=Rb:D1=Rc:D1). The lowest gear shift points U1 on the upshift side in the maps as well as the vehicle speed are also defined to be the same threshold (Ra:U1=Rb:U1=Rc:U1).

Accordingly, regardless of the map to be used, a downshift or an upshift is performed at the same speed and at the same number of revolutions during a gear shift when the vehicle speed is the lowest. Accordingly, the driver is less likely to feel discomfort without losing a comfortable travel feeling. Both the improvement in fuel efficiency and the comfortable traveling performance can be achieved at a high level.

When comparison is made between the gear shift points at the same gear position on both the downshift side and the upshift side in these maps (combustion request map 52, travel request map 53, and regeneration request map 51), the thresholds on the upshift side are defined to be larger than the thresholds on the downshift side.

Specifically, the gear shift point on the upshift side has a hysteresis of approximately +5 km/h in the vehicle speed with respect to the gear shift point at the same gear position on the downshift side. The same map is used when a transition between the downshift side and the upshift side is first performed.

For example, if the vehicle speed reduces to 23 km/h (the number of revolutions is Rc:D2) when the automobile 1 is travelling using the regeneration request map 51, the gear position shifts down from the third gear to the second gear according to the definition of the gear shift point D2. After that, when acceleration is first performed, the same regeneration request map 51 is used instead of a transition to the travel request map 53.

That is, a gear shift is performed according to the definition on the upshift side in the regeneration request map 51, and an upshift from the second gear to the third gear is performed according to the definition of the gear shift point U2. Accordingly, no shift change is performed until the vehicle speed reaches 28 km/h (the number of revolutions reaches Rc:U2) when acceleration is first performed. That is, the same gear position is used until the vehicle speed increases by approximately 5 km/h.

In addition, for example, if the vehicle speed increases to 33 km/h (the number of revolutions is Ra:U4) when the automobile 1 is travelling by using the combustion request map 52, an upshift from the fourth gear to the fifth gear is performed according the definition of the gear shift point U4. After that, when deceleration is first performed, the same combustion request map 52 is used instead of a transition to the regeneration request map 51.

That is, a gear shift is performed according to the definition on the downshift side in the combustion request map 52 and a downshift from the fifth gear to the fourth gear is performed according to the definition of the gear shift point D4. Accordingly, when deceleration is first performed, no shift change is performed until the vehicle speed reaches 28 km/h (the number of revolutions is Ra:D4). That is, the same gear position is used until the vehicle speed decelerates by approximately 5 km/h.

This can suppress complicated gear shifts and the driver is less likely to feel discomfort. Accordingly, the driver does not lose a comfortable travel feeling. Both the improvement in fuel efficiency and the comfortable traveling performance can be achieved at a high level.

A transition to a different gear shift map 50 is performed in the timing of a shift change to be performed subsequently. At this time, when both thresholds are different from each other, a gear shift is performed by using the intermediate value of both thresholds to enable a continuous transition.

For example, when deceleration is being performed at the fourth gear by using the combustion request map 52, a downshift to the third gear is performed according to the definition of the gear shift point D3 when the vehicle speed reaches 23 km/h (the number of revolutions is Ra:D3). At this time (when deceleration is being performed at the fourth gear by using the combustion request map 52), when a transition to the travel request map 53 is performed, since a vehicle speed of 24 km/h (the number of revolutions is Rb:D3) is defined at the gear shift point D3 of the travel request map 53, a downshift to the third gear in the travel request map 53 is set to be performed at the intermediate value (for example, a vehicle speed of 23.5 km/h and the number of revolutions corresponding thereto).

Since this gear shift control device 20 has the gear shift map 50 including three different shift patterns corresponding to the main operating states of the automobile 1 as described above, both the overall improvement in fuel efficiency and the comfortable traveling performance can be achieved.

<Gear Shift of the Automatic Transmission During Deceleration Regeneration>

As described above, when this automobile 1 starts decelerating to stop, this automobile 1 performs regeneration with the engine 4 disconnected to recover more energy.

In this case, however, when the automatic transmission 8 performs a downshift to a low gear position, since the inertia of the automobile 1 is large, a torque difference is generated between the input side of the transmission clutch 8e on which only the torque caused by the regeneration of the driving motor 5 acts and the output side of the transmission clutch 8e on which the torque caused by the inertia of the automobile 1 acts.

Unless this torque difference is eliminated, a large torque shock occurs during a gear shift, that is, during engagement of the transmission clutch 8e. This torque shock may give discomfort to the driver.

Generally, deceleration is accompanied by a brake operation. The driving motor 5 performs regeneration in cooperation with braking by the brakes 3 (cooperative regeneration). During deceleration in which the brake pedal 18 is depressed and a braking force is applied by the brakes 3, the braking force reduces the torque on the output side of the transmission clutch 8e. Since the torque difference is reduced, a torque shock can be reduced.

On the other hand, the automobile 1 may decelerate without a braking force by the brakes 3 and may stop or travel very slowly. Since no braking force is applied by the brakes 3 during deceleration regeneration (during non-cooperative regeneration) without using the brakes 3, a large torque shock occurs during a gear shift.

The torque shock may be reduced by slipping the transmission clutch 8e. However, the slipping of the transmission clutch 8e is insufficient against the torque due to the inertia of the vehicle. This also applies even when the torque due to the regeneration of the driving motor 5 is added.

Accordingly, to prevent a torque shock, the relay clutch 6 needs to be engaged before a downshift to a low gear position to apply the torque driven by the engine 4. Addition of the torque of the engine 4 can cancel the torque due to the inertia of the vehicle.

In this case, however, regeneration cannot be performed. The fuel efficiency improvement effect obtained by regeneration with the engine 4 disconnected cannot be obtained.

Accordingly, in this gear shift control device 20, the thresholds are defined in the individual maps according to the operating states of the automobile 1 so that appropriate gear shifts can be performed during such deceleration regeneration and both the improvement in fuel efficiency and the comfortable traveling performance can be achieved.

Specifically, on the downshift side in the combustion request map 52 and the travel request map 53 (non-cooperative regeneration map), the threshold of a predetermined low gear shift point is defined to be smaller than the thresholds of the gear shift points higher than this low gear shift point and is defined to be smaller than the threshold of the predetermined low gear shift point on the downshift side in the regeneration request map 51 (cooperative regeneration map).

In the automobile 1, the predetermined low gear shift point here is the gear shift point D2 (also referred to below as the specific gear shift point D2) at which the gear position switches from the third gear to the second gear. As described later, the relay clutch 6 switches from the disconnected state to the connected state before the switching timing at this specific gear shift point D2.

As illustrated in FIG. 7, the thresholds (Ra:D2 and Rb:D2) of the specific gear shift point D2 in the combustion request map 52 and the travel request map 53 are defined to be smaller than the thresholds of the gear shift points D3 to D7 higher than the specific gear shift point D2. In addition, the thresholds (Ra:D2 and Rb:D2) of the specific gear shift point D2 in the combustion request map 52 and the travel request map 53 are defined to be smaller than the threshold (Rc:D2) of the specific gear shift point D2 in the regeneration request map 51.

Accordingly, the gear position switches from the third gear to the second gear at a relatively high number of revolutions during cooperative regeneration in which the brakes 3 are used and the regeneration request map 51 is used. Since a high number of revolutions is held, reduction in the regenerative efficiency of the driving motor 5 can be suppressed.

Since a braking force is applied by the brakes 3, the braking force reduces the torque on the output side of the transmission clutch 8e. The torque difference is reduced, so a torque shock is reduced.

On the other hand, during non-cooperative regeneration in which the brakes 3 are not used and the combustion request map 52 or the travel request map 53 is used, the gear position switches from the third gear to the second gear at relatively low number of revolutions. Accordingly, the timing of a downshift can be delayed in turn.

This can also delay the timing at which the engine 4 is started by connecting the relay clutch 6 to suppress a torque shock. Since deceleration regeneration can be kept longer in turn, reduction in the fuel efficiency improvement effect can be suppressed.

Moreover, the threshold of the specific gear shift point D2 is smaller than the thresholds of the gear shift points D3 to D7, which are higher than the specific gear shift point D2, in other words, the thresholds of the gear shift points D3 to D7, which are higher than the specific gear shift point D2, are larger than the threshold of the specific gear shift point D2. Accordingly, a high number of revolutions can be kept in the gear positions higher than the specific gear shift point D2. Accordingly, reduction in the regenerative efficiency of the driving motor 5 can be suppressed in the process.

(Gear Shift Control During Deceleration Regeneration)

Figure 8:
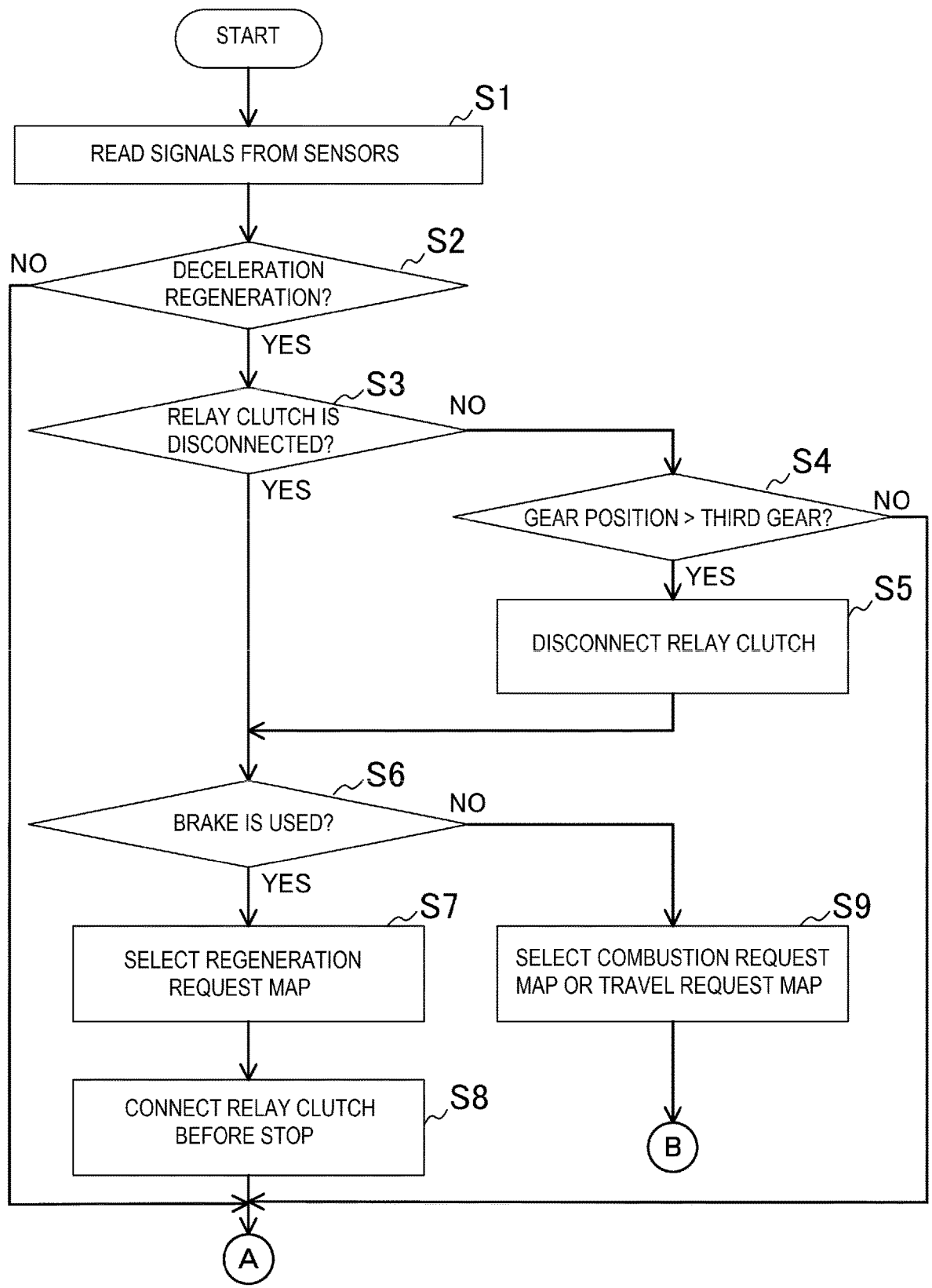
FIG. 8 is a flowchart of gear shift control during deceleration regeneration performed by the gear shift control device.
Figure 9:
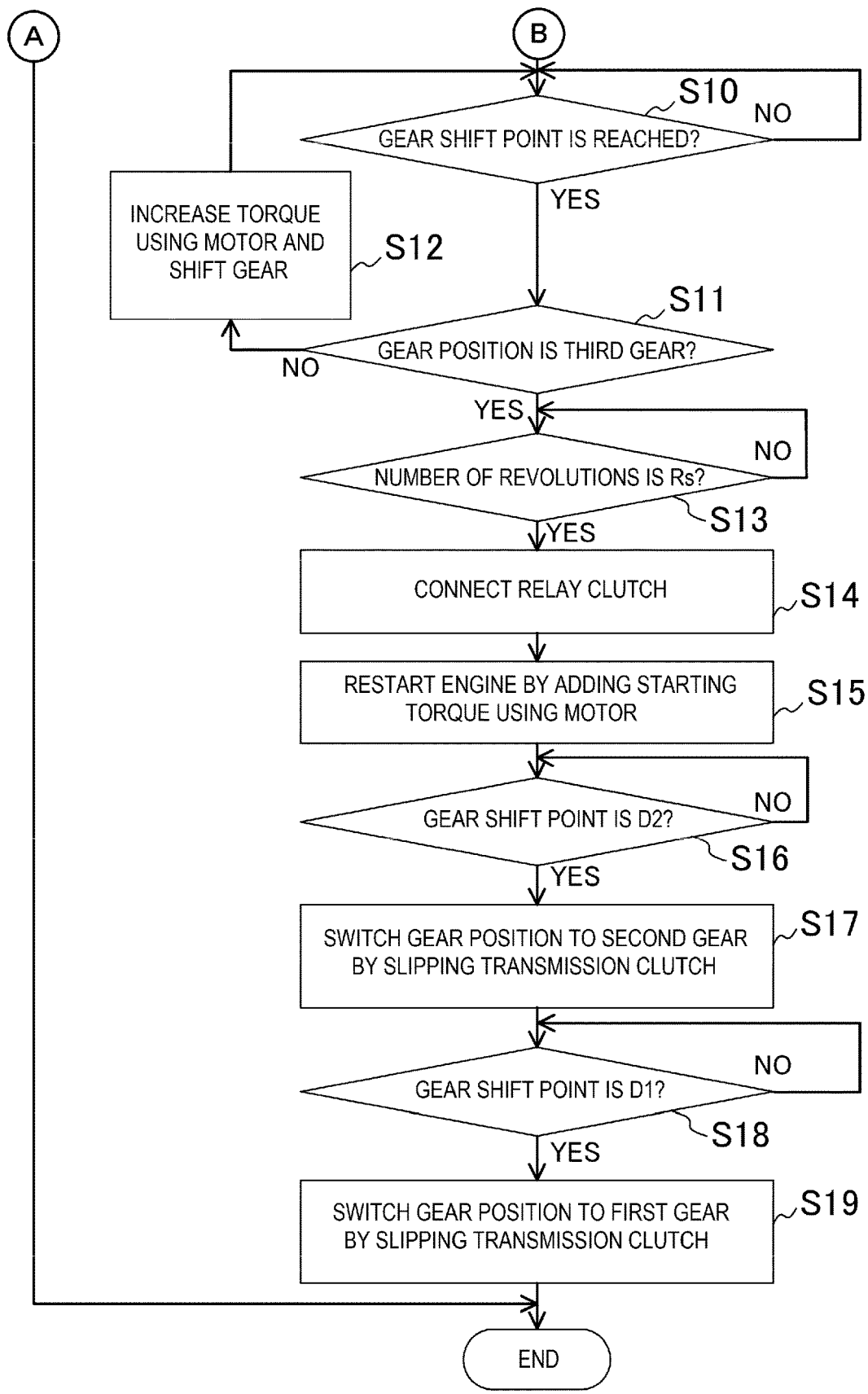
FIG. 9 is a flowchart continued from FIG. 8.
Figure 10:
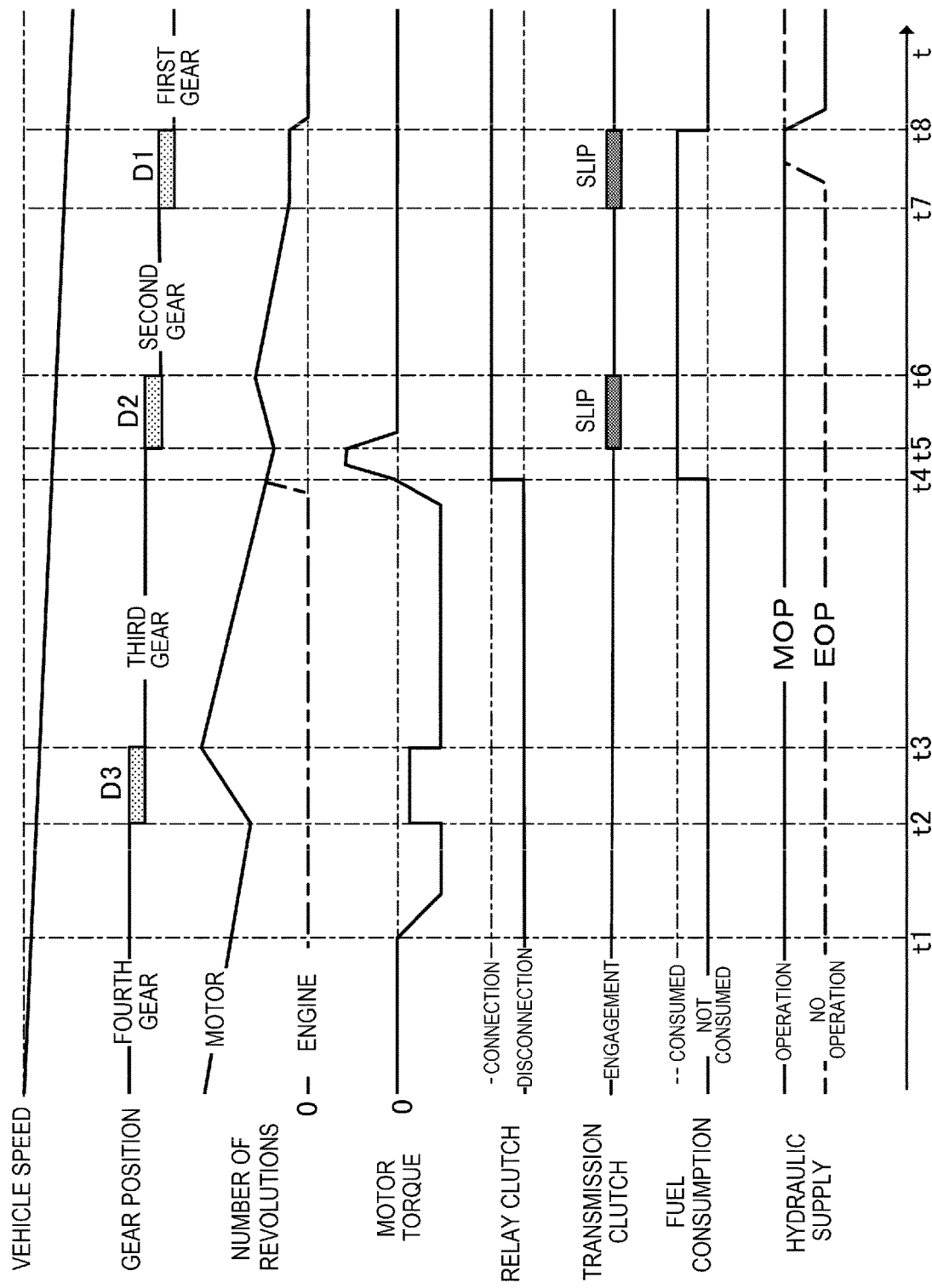
FIG. 10 is a time chart of main elements corresponding to second deceleration regeneration end processing.

FIGS. 8 to 10 illustrate an example of gear shift control during deceleration regeneration in the process of stopping the automobile 1. FIGS. 8 and 9 are flowcharts of the gear shift control performed by the gear shift control device 20 (PCM 21 and TCM 22). FIG. 10 is a time chart corresponding to a second deceleration regeneration end processing, which will be described later. It should be noted that the automobile 1 here is assumed to be decelerating from a medium speed range (for example, 40 km/h).

As illustrated in FIG. 8, during a travel of the automobile 1, the gear shift control device 20 reads signals output from various sensors and determines the operating state of the automobile 1 based on these signals (step S1). The gear shift control device 20 determines whether deceleration regeneration is performed based on the operating state (step S2).

As a result, when it is determined that deceleration regeneration is performed (Yes in step S2), the gear shift control device 20 (relay clutch control unit 22*a*) determines whether the relay clutch 6 is in the disconnected state, that is, whether the engine 4 is disconnected (step S3).

When it is determined that the relay clutch 6 is in the connected state (No in step S3), the relay clutch 6 is placed in the disconnected state (step S5) on the assumption that the gear position of the automatic transmission 8 is in a predetermined high speed position (the fourth gear or more) (Yes in step S4).

That is, the gear shift control device 20 (relay clutch control unit 22*a*) performs processing (deceleration regeneration start processing) that disconnects the relay clutch 6 at a predetermined high speed position before deceleration regeneration. Since this can stop the engine 4 and perform deceleration regeneration without being affected by the engine 4, fuel efficiency can be improved. Accordingly, the gear shift control device 20 starts deceleration regeneration after the relay clutch 6 is in the disconnected state.

Next, the gear shift control device 20 performs processing (deceleration regeneration end processing) that connects the relay clutch 6 in the disconnected state before the automobile 1 stops. In the deceleration regeneration end processing, the process to be performed depends on whether the deceleration regeneration is cooperative regeneration that uses the brakes 3 or non-cooperative regeneration that does not use the brakes 3.

Specifically, one of the following processes is performed: the process (first deceleration regeneration end processing) that connects the relay clutch 6 by using the regeneration request map 51 before the automobile 1 stops or the process (second deceleration regeneration end processing) that connects the relay clutch 6 before switching at a predetermined low gear shift point by using either the combustion request map 52 or the travel request map 53.

That is, the gear shift control device 20 determines whether the brakes 3 are being used (step S6). For example, when the brake pedal 18 is depressed, the gear shift control device 20 performs the first deceleration regeneration end processing. Then, the gear shift control device 20 selects the regeneration request map 51 from the gear shift map 50 (step S7).

This further decelerates the automobile 1 and the gear position switches at a relatively high number of revolutions even when switching at a low gear position is performed in the automatic transmission 8. Since a high number of revolutions is held, reduction in the regenerative efficiency of the driving motor 5 can be suppressed.

Since the braking force is applied by the brakes 3, the braking force reduces the torque on the output side of the transmission clutch 8*e*. The torque difference is reduced, so the torque shock is reduced.

Accordingly, the gear shift control device 20 in this case couples the engine 4 to the automatic transmission 8 by connecting the relay clutch 6 before the automobile 1 stops (step S8).

On the other hand, when it is determined that the brakes 3 are not used (No in step S6), the gear shift control device 20 performs the second deceleration regeneration end processing. Then, the combustion request map 52 or the travel request map 53 is selected from the gear shift map 50 in accordance with the operating state of the automobile 1 (step S9).

FIG. 10 is a time chart corresponding to the second deceleration regeneration end processing. This diagram illustrates the state from the time at which the automobile 1 decelerates to approximately 25 km/h until the automobile 1 stops. The relay clutch 6 has been disconnected earlier as described above, so the engine 4 has been disconnected and stopped (the number of revolutions of the engine is zero and no fuel is consumed).

Since the engine 4 stops but the driving motor 5 is rotating, the MOP 13 operates and supplies the hydraulic pressure to the automatic transmission 8. In this automobile 1, the specific gear shift point D2 at which switching from the third gear to the second gear is performed is used as the predetermined low gear shift point described above. That is, the relay clutch 6 is connected before switching at the specific gear shift point D2.

Since as the vehicle speed is approximately 25 km/h at the start point of the time chart in FIG. 10, the gear position of the automatic transmission 8 is the fourth gear. In this example, deceleration regeneration starts in the process of the fourth gear (timing t1). Since the motor torque output by the driving motor 5 becomes a negative value, which is opposite to a positive value during driving, when deceleration regeneration starts, and the energy consumed during deceleration is recovered by the power generation.

As illustrated in FIG. 9, the gear shift control device 20 determines whether the automobile 1 has reached a gear shift point in the process of deceleration of the automobile 1 (step S10). When the gear shift point is reached, it is determined whether the gear position at that time is the gear position (third gear) before switching at the specific gear shift point D2 (step S11).

When it is determined that the gear position is not the third gear (No in step S11), the gear shift control device 20 performs a gear shift while suppressing the occurrence of a torque shock by increasing the output torque of the driving motor 5 (step S12). This corresponds to the period from t2 to t3 in FIG. 10.

That is, when switching at a gear shift point higher than the specific gear shift point D2 (e.g., at gear shift point D3) is performed in the second deceleration regeneration end processing, the gear shift control device 20 prevents the occurrence of a torque shock by driving the driving motor 5 according to the gear shift point. Since the number of revolutions of the driving motor 5 is relatively high, the occurrence of a torque shock can be prevented only by increasing the torque of the driving motor 5.

On the other hand, when it is determined that the gear position is the third gear (Yes in step S11), the gear shift control device 20 determines whether the number of revolutions of the driving motor 5 has reached a predetermined number of connection revolutions Rs (step S13). The number of connection revolutions Rs is slightly higher than the number of revolutions at the specific gear shift point D2, and the relay clutch 6 is engaged to enter the connected state at the number of connection revolutions Rs. The number of connection revolutions Rs is preset in the gear shift control device 20.

Then, when it is determined that the number of connection revolutions Rs has been reached (Yes in step S13), the gear shift control device 20 engages the relay clutch 6 and couples the engine 4 with the automatic transmission 8 (step S14). This corresponds to the timing t4 in FIG. 10.

After that, the gear shift control device 20 drives the driving motor 5, adds the starting torque, and restarts the engine 4 (step S15). This increases the motor torque to a predetermined value. This corresponds to the period from t4 to t5 in FIG. 10. Fuel consumption is started by restarting the engine 4. However, reduction in the fuel efficiency improvement effect can be suppressed because deceleration regeneration can be performed immediately before the specific gear shift point D2.

Then, the gear shift control device 20 switches the gear position to the second gear by slipping the transmission clutches 8e (specifically, the friction engagement elements thereof) at a timing (Yes in step S16) at which the specific gear shift point D2 has been reached (step S17). This corresponds to the period from t5 to t6 in FIG. 10.

That is, the gear shift control device 20 drives both the engine 4 and the driving motor 5 during switching at the specific gear shift point D2 in the second deceleration regeneration end processing and slips the friction engagement elements of the automatic transmission 8. This cancels the torque due to the inertia of the vehicle by combining the torques of both the engine 4 and the driving motor 5 and the slip effect of the transmission clutches 8e. Accordingly, the occurrence of a torque shock can be prevented.

It takes time to perform a series of processes described above. In contrast, in both the combustion request map 52 and the travel request map 53, the difference between the thresholds of the specific gear shift point D2 and the gear shift point D3 larger than the specific gear shift point D2 by one level is defined to be larger than the differences among the other gear shift points (see FIG. 7).

Accordingly, the time required for suppressing a torque shock can be obtained sufficiently, so a torque shock can be suppressed in a stable and effective manner.

After that, the driving motor 5 stops and the automobile 1 travels by being driven by the engine 4. The gear shift control device 20 determines whether the gear shift point D1 has been reached (step S18). When it is determined that the gear shift point D1 has been reached (Yes in step S18), the gear shift control device 20 switches the gear position to the first gear by slipping the transmission clutches 8e (step S19). This corresponds to the period from t7 to t8 in FIG. 10.

Since the number of revolutions is low and both the engine 4 and the driving motor 5 are coupled to the automatic transmission 8, the occurrence of a torque shock can be prevented only by slipping the transmission clutches 8e. The gear shift control device 20 stops the engine 4 when the automatic transmission 8 switches to the first gear. Since both the engine 4 and the driving motor 5 stop, the gear shift control device 20 operates the EOP 14. The EOP 14 supplies the hydraulic pressure to the automatic transmission 8 and holds the gear position in the first gear.

As described above, the gear shift control device 20 disconnects the engine 4 during deceleration, performs deceleration regeneration by using the gear shift map 50 corresponding to the operating state of the automobile 1, and can suppress a torque shock that may be caused by switching of the gear position of the automatic transmission 8 during deceleration. Accordingly, both the overall improvement in fuel efficiency and the comfortable traveling performance can be achieved.

It should be noted that the disclosed technology is not limited to the embodiments described above and also includes various other structures. For example, the structure of the automobile 1 is an example. The structure can be changed according to the specification.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: automobile (vehicle)
3: brake
4: engine
5: driving motor
6: relay clutch
7: inverter
8: automatic transmission
9: high voltage battery
10: DC-to-DC converter
11: low voltage battery
12: controller area network (CAN)
13: mechanical oil pump (MOP)
14: electric oil pump (EOP)
18: brake pedal
19: accelerator pedal
20: gear shift control device
21: powertrain control module (PCM)
21a: motor control unit
21b: engine control unit
21c: oil pump control unit
21d: regeneration control unit
22: transmission control module (TCM)
22a: relay clutch control unit
22b: transmission control unit
50: gear shift map
51: regeneration request map (cooperative regeneration map)
52: combustion request map (non-cooperative regeneration map, first map)
53: travel request map (non-cooperative regeneration map, second map)

The invention claimed is:

1. A gear shift control device of a vehicle including an engine and a motor installed as driving sources, and an automatic transmission provided between the driving sources and drive wheels, the automatic transmission performing a gear shift by switching between high and low gear positions through hydraulic control, the gear shift control device comprising:
- memory storing a gear shift map that defines, for each of a plurality of gear shift points, thresholds of a number of revolutions on a downshift side and on an upshift side to determine a switching start timing of each of the gear positions;
- a transmission control unit that switches between the high and low gear positions based on the gear shift map; and
- a regeneration control unit that controls regeneration by the motor,
- wherein the gear shift map includes a cooperative regeneration map used in cooperative regeneration that cooperates with a brake, and a non-cooperative regeneration map used in other than cooperative regeneration, the non-cooperative regeneration map defining the thresholds of revolutions lower than the thresholds in the cooperative regeneration map, and
- wherein the non-cooperative regeneration map includes a first map that defines the thresholds of relatively low revolutions and is used when an accelerator is not used, and a second map that defines the thresholds of relatively higher revolutions and is used when the accelerator is used.

2. The gear shift control device according to claim 1, wherein the thresholds of high gear shift points among the gear shift points are defined to be an identical value on the downshift side in the cooperative regeneration map and the second map, the high gear shift points being higher than a predetermined low gear shift point.

3. The gear shift control device according to claim 2, further comprising:
- a relay clutch control unit that controls a relay clutch,
- wherein the relay clutch is included in the vehicle, the relay clutch being provided between the engine and the automatic transmission to enable the engine to be disconnected from the automatic transmission,
- wherein the relay clutch control unit performs deceleration regeneration start processing that disconnects the relay clutch in a predetermined high speed position during deceleration and performs deceleration regeneration end processing that connects the disconnected relay clutch,
- wherein the deceleration regeneration end processing includes processing that connects the relay clutch before switching at a predetermined low gear shift point by using the non-cooperative regeneration map, and
- wherein in the non-cooperative regeneration map, a difference between the thresholds of the predetermined low gear shift point and one of the gear shift points that is higher than the predetermined low gear shift point by one level is defined to be larger than differences among the other gear shift points.

4. The gear shift control device according to claim 3, wherein the thresholds of a lowest gear shift point in the non-cooperative regeneration map and a lowest gear shift point in the cooperative regeneration map are defined to be an identical value.

5. The gear shift control device according to claim 4, wherein when the gear shift points on the downshift side and the upshift side that have an identical gear position in the gear shift map are compared with each other, the thresholds on the upshift side are defined larger than the thresholds on the downshift side, and
wherein when a transition between the downshift side and the upshift side is first performed, an identical gear shift map is used.

6. The gear shift control device according to claim 3, wherein when the gear shift points on the downshift side and the upshift side that have an identical gear position in the gear shift map are compared with each other, the thresholds on the upshift side are defined larger than the thresholds on the downshift side, and
wherein when a transition between the downshift side and the upshift side is first performed, an identical gear shift map is used.

7. The gear shift control device according to claim 2, wherein the thresholds of a lowest gear shift point in the non-cooperative regeneration map and a lowest gear shift point in the cooperative regeneration map are defined to be an identical value.

8. The gear shift control device according to claim 7, wherein when the gear shift points on the downshift side and the upshift side that have an identical gear position in the gear shift map are compared with each other, the thresholds on the upshift side are defined larger than the thresholds on the downshift side, and
wherein when a transition between the downshift side and the upshift side is first performed, an identical gear shift map is used.

9. The gear shift control device according to claim 2, wherein when the gear shift points on the downshift side and the upshift side that have an identical gear position in the gear shift map are compared with each other, the thresholds on the upshift side are defined larger than the thresholds on the downshift side, and
wherein when a transition between the downshift side and the upshift side is first performed, an identical gear shift map is used.

10. The gear shift control device according to claim 1, further comprising:
- a relay clutch control unit that controls a relay clutch,
- wherein the relay clutch is included in the vehicle, the relay clutch being provided between the engine and the automatic transmission to enable the engine to be disconnected from the automatic transmission,
- wherein the relay clutch control unit performs deceleration regeneration start processing that disconnects the relay clutch in a predetermined high speed position during deceleration and performs deceleration regeneration end processing that connects the disconnected relay clutch,
- wherein the deceleration regeneration end processing includes processing that connects the relay clutch before switching at a predetermined low gear shift point by using the non-cooperative regeneration map, and
- wherein in the non-cooperative regeneration map, a difference between the thresholds of the predetermined low gear shift point and one of the gear shift points that is higher than the predetermined low gear shift point by one level is defined to be larger than differences among the other gear shift points.

11. The gear shift control device according to claim 1, wherein the thresholds of a lowest gear shift point in the non-cooperative regeneration map and a lowest gear shift point in the cooperative regeneration map are defined to be an identical value.

12. The gear shift control device according to claim 11, wherein when the gear shift points on the downshift side and the upshift side that have an identical gear position in the gear shift map are compared with each other, the thresholds on the upshift side are defined larger than the thresholds on the downshift side, and wherein when a transition between the downshift side and the upshift side is first performed, an identical gear shift map is used.

13. The gear shift control device according to claim 1, wherein when the gear shift points on the downshift side and the upshift side that have an identical gear position in the gear shift map are compared with each other, the thresholds on the upshift side are defined larger than the thresholds on the downshift side, and wherein when a transition between the downshift side and the upshift side is first performed, an identical gear shift map is used.

* * * * *